United States Patent
Biehl et al.

(10) Patent No.: US 10,450,971 B2
(45) Date of Patent: Oct. 22, 2019

(54) METHOD AND DEVICE FOR CONTROLLING A COMBUSTION OF AN INTERNAL COMBUSTION ENGINE

(71) Applicant: Robert Bosch GmbH, Stuttgart (DE)

(72) Inventors: Matthias Biehl, Krottelbach (DE); Carsten Kluth, Stuttgart (DE); Jasmin Dieringer, Stuttgart (DE); Michael Meister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 15/887,463

(22) Filed: Feb. 2, 2018

(65) Prior Publication Data

US 2018/0223749 A1 Aug. 9, 2018

(30) Foreign Application Priority Data

Feb. 6, 2017 (DE) .......... 10 2017 201 801

(51) Int. Cl.
| | | |
|---|---|---|
| F02D 35/00 | (2006.01) | |
| F02D 35/02 | (2006.01) | |
| F02D 41/14 | (2006.01) | |
| G01M 15/04 | (2006.01) | |

(52) U.S. Cl.
CPC ......... *F02D 35/027* (2013.01); *F02D 35/028* (2013.01); *F02D 41/1497* (2013.01); *G01M 15/04* (2013.01); *F02D 35/021* (2013.01); *F02D 35/023* (2013.01); *F02D 2200/025* (2013.01)

(58) Field of Classification Search
CPC .. F02D 35/027; F02D 35/028; F02D 41/1497; F02D 35/021; F02D 35/023; F02D 2200/026
See application file for complete search history.

(56) References Cited

U.S. PATENT DOCUMENTS

| | | | | |
|---|---|---|---|---|
| 5,090,383 | A * | 2/1992 | Demizu ................. | F02P 5/152 123/406.23 |
| 8,327,826 | B2 * | 12/2012 | Okoshi .................. | F02P 5/152 123/406.23 |

(Continued)

FOREIGN PATENT DOCUMENTS

| | | |
|---|---|---|
| DE | 19946346 A1 | 3/2001 |
| DE | 102008042475 A1 | 4/2010 |
| DE | 102014224800 A1 | 6/2016 |

*Primary Examiner* — Thomas N Moulis
(74) *Attorney, Agent, or Firm* — Norton Rose Fulbright US LLP; Gerard Messina

(57) ABSTRACT

A method and a device for controlling a combustion of an internal combustion engine are provided, including an arrangement, which generates a signal for the intensity of the combustion in a combustion chamber of the internal combustion engine from a sensor signal of the internal combustion engine. The intensity is compared to a reference level, which was formed from intensities of preceding combustions in the combustion chamber by moving average calculation. An irregular combustion is detected if the intensity exceeds the reference level in a predetermined manner, and then at least one operating parameter of the internal combustion engine is shifted in the direction of an avoidance of the irregular combustion. Following an irregular combustion, the averaging for forming the reference level is accelerated for a specified duration.

9 Claims, 1 Drawing Sheet

(56) References Cited

U.S. PATENT DOCUMENTS

| | | | | |
|---|---|---|---|---|
| 2010/0168991 A1* | 7/2010 | Hamama | ............... | F02D 35/027 |
| | | | | 701/111 |
| 2012/0285161 A1* | 11/2012 | Kerns | ................. | F02D 41/0087 |
| | | | | 60/598 |
| 2016/0333806 A1* | 11/2016 | Takayanagi | ............. | F02P 5/152 |

* cited by examiner

METHOD AND DEVICE FOR CONTROLLING A COMBUSTION OF AN INTERNAL COMBUSTION ENGINE

CROSS REFERENCE

The present application claims the benefit under 35 U.S.C. § 119 of German Patent Application No. DE 102017201801.1 filed on Feb. 6, 2017, which is expressly incorporated herein by reference in its entirety.

FIELD

The present invention relates to a method and a device for controlling a combustion of an internal combustion engine.

BACKGROUND INFORMATION

A method and a device are described in German Patent Application No. DE 10 2014 224 800 A1, in which a combustion of an internal combustion engine is controlled in the form of a knock control. For this purpose, a signal for the intensity of the combustion in the combustion chamber is produced by a structure-borne noise sensor and a knocking combustion is detected if this value exceeds a reference value in a specified manner. The reference value is produced from the measured values of preceding combustion processes by way of a moving average calculation. If a combustion was detected as exhibiting engine knock, then an ignition angle is retarded.

SUMMARY

An example method according to the present invention and an example device according to the present invention for controlling a combustion of an internal combustion engine have the advantage that there is an improved detection of irregular combustions. For this purpose, immediately after an irregular combustion and the shifting of an operating parameter of the internal combustion engine in the direction of an avoidance of the irregular combustion, an accelerated averaging is activated, in which the reference level is adapted more quickly. This ensures the detection of the irregular combustions to the changed conditions of the operation of the internal combustion engine by shifting an operating parameter of the internal combustion engine in the direction of an avoidance of the irregular combustion. In particular, it is thus ensured that after an adjustment of an operating parameter of the internal combustion engine in the direction of an avoidance of the irregular combustion, a suitable reference level is again quickly available, which also allows for a detection of irregular combustions during this time period. The quality of the control of the combustion of the internal combustion engine is thus increased.

Further advantages and improvements are described herein. The sensor signal advantageously may take the form of a structure-borne noise signal, a cylinder pressure signal or an ionic-current signal. All suitable methods are thus drawn upon to detect irregular combustions. The duration in which an acceleration of the averaging is performed may be defined either by a time duration or by a number of combustion processes. A particularly simple averaging or an accelerated averaging that is adapted to the respective operation is thus ensured. The averaging occurs in a particularly simple manner in that a weighted sum of a preceding average value and the currently measured intensity is formed. By a corresponding weighting, in particular by a greater weighting of the current intensity following the adjustment of an operating parameter of the internal combustion engine in the direction of an avoidance of the irregular combustion, it is thus possible to achieve an acceleration of the averaging in a particularly simple manner. The example procedure makes it possible reliably to detect both internal combustion engine knock as well as a premature ignition or surface ignition of the internal combustion engine.

BRIEF DESCRIPTION OF THE DRAWINGS

Exemplary embodiments of the present invention are shown in the figures and are explained in greater detail below.

DETAILED DESCRIPTION OF EXAMPLE EMBODIMENTS

Figure 1:
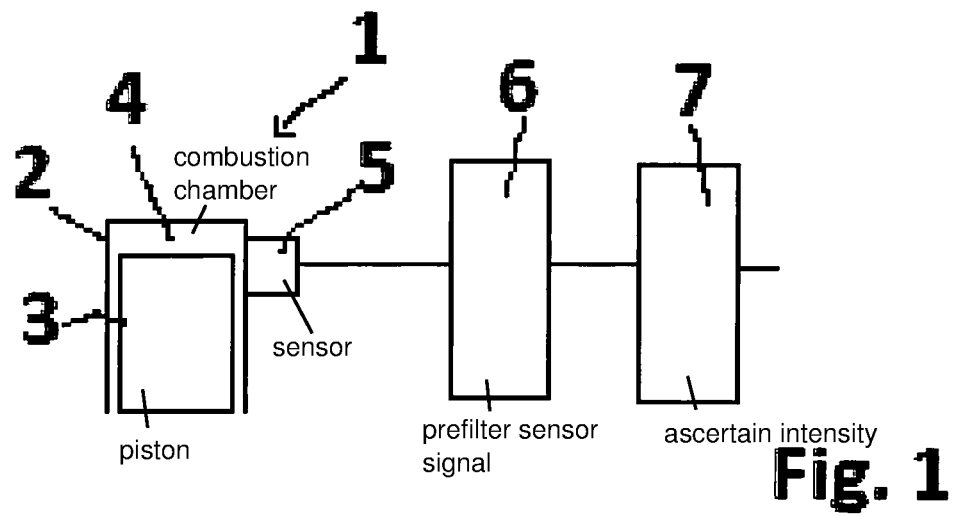
FIG. 1 shows a schematic internal combustion engine and a device for controlling the combustion of the internal combustion engine.

FIG. 1 schematically shows an internal combustion engine 1, which has a cylinder 2 in which a piston 3 is situated. Cylinder 2 and piston 3 define a combustion chamber 4, in which the actual combustion occurs. What is not shown are the usual devices such as an induction manifold and exhaust pipe, air intake valves and exhaust discharge valves, an injection of fuel into combustion chamber 4 or into the induction manifold, a throttle valve, a spark plug and other usual components of a conventional internal combustion engine. The internal combustion engine is in particular a spark-ignition engine. A sensor 5, in particular a knock sensor, is situated on the outside of cylinder 2. A sensor 5 of this kind detects structure-borne noise signals of combustion processes in combustion chamber 4 and transmits these to a subsequent signal processor 6.

As an alternative to the knock sensor 5 in the form of a structure-borne noise sensor, it is also possible to use other sensors for measuring the intensity of the combustion in combustion chamber 4. For example, it is also possible to evaluate a cylinder pressure signal or a ionic-current signal. The corresponding structure-borne noise sensors, cylinder pressure sensors or ionic-current sensors are already well known in particular for evaluating the intensity of the combustion in connection with the determination whether or not a knocking combustion occurred in combustion chamber 4.

Aside from engine knock, these sensors are furthermore also suitable for determining other irregular combustions in the combustion chamber such as surface ignitions or premature ignitions. Engine knock usually signifies inadmissibly high pressure peaks that occur following an ignition by a spark plug. A surface ignition or premature ignition signify irregular combustions that typically occur prior to an ignition spark on the spark plug. It is thus possible to differentiate these two different irregular combustions very well from engine knock since they occur in time prior to or following the ignition spark in combustion chamber 4.

To detect irregular combustions of this kind, the sensor signals of sensor 5 undergo a first preprocessing in processing arrangement 6. First, in processing step 6, the analog sensor signal is prefiltered in a certain manner and, if indicated, is converted into a digital sensor signal. The digital sensor signal is then passed on from the preprocessing 6 to a further processing 7. In further processing 7, first an intensity of the combustion in combustion chamber 4 is ascertained from the sensor signal. The intensity may be ascertained for example by selecting a suitable time window or angular window relative to the ignition spark and integrating the rectified sensor signal. Alternatively, however, it is also possible to evaluate the highest amplitude of the sensor signal. Another alternative is a Fourier transform and evaluation of only certain frequency ranges of the Fourier-transformed signal.

All these method have in common the fact that at the end one single number is ascertained, which is referred to in the following as the intensity of the combustion, this intensity being a measure for the strength of the combustion or irregular combustion in combustion chamber 4. In the case of cylinder pressure sensors and ionic-current sensors, the sensor signals contain information that allows for an assessment of the entire combustion process. In the case of structure-borne noise sensors, the sensor signal essentially contains only information about the irregular combustion processes. For this purpose, an intensity is ascertained for each individual combustion process in combustion chamber 4. This intensity of the individual current combustion is then compared to a reference level. The reference level is formed in that the intensities of preceding combustion processes in combustion chamber 4 are taken into consideration, the intensities of preceding combustion processes being in particular averaged. The intensity of each individual combustion is thus compared to a reference value that results from the intensities of preceding combustions. Following each combustion in combustion chamber 4, for example, a new reference value $Ref_{new}$ is calculated from the preceding old reference value $Ref_{old}$ and from the intensity I measured in the combustion according to the following formula:

$$Ref_{new}=(1-F)*Ref_{old}+I*F$$

The factor F is chosen in such a way that it assumes a value between 0 and 1.

By selection of this factor F, it is thus possible to control to what extent the previous reference value $Ref_{old}$ and the intensity I are taken into account in the formation of the new reference value $Ref_{new}$. By choosing a small factor F, for example in the order of magnitude of 0.1, the old combustions that occurred in the more distant past are weighted more heavily, and by choosing a greater factor for F, for example in the order of magnitude of 0.9, the last combustion or the most recent combustions are weighted more heavily. This is important especially when there is a change in the operation of the internal combustion engine, in particular, if a fundamentally changed level of intensity results as a result of a change of the operating conditions of the internal combustion engine.

Figure 2:
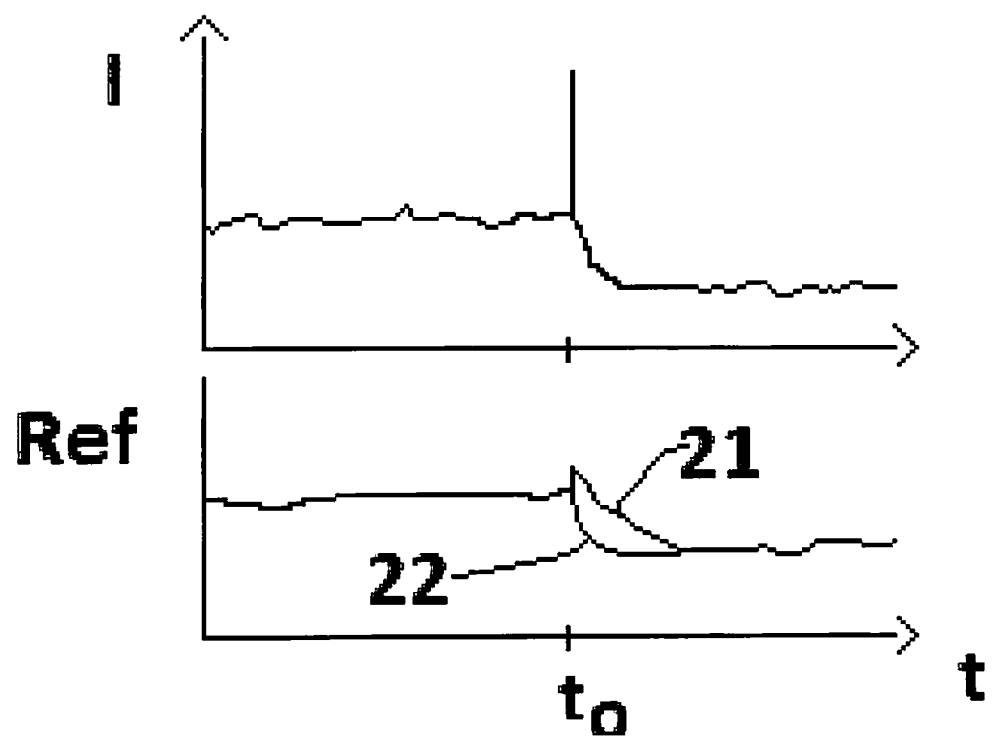
FIG. 2 shows a diagram representing the intensity of the combustion and the reference level prior to and after an irregular combustion.

In FIG. 2, intensity I and reference level Ref are now plotted schematically against time t. As may be seen from FIG. 2, intensity I fluctuates with a certain deviation about a certain level. Considered over time, there are only small changes in intensity I, intensity I at times by chance assuming a somewhat higher value and at times a somewhat lower value. At time t0, an irregular combustion occurs, for example engine knock, which is expressed in a greatly increased intensity I at time t0. By comparison with reference level Ref, it is possible to detect clearly at this time that this concerns an irregular combustion, for example engine knock, and corresponding countermeasures are initiated. These countermeasures comprise a certain ignition angle adjustment, in particular a shift of the ignition angle in the direction of a later combustion. By such a shift of the ignition angle in the late direction, it is possible reliably to avoid the occurrence of irregular combustions, in particular engine knock. At the same time, the average value about which the intensity I fluctuates also shifts as a result of this measure. This may be seen in FIG. 2 by the fact that after time t0 and the ignition angle adjustment occurring at that time in the late direction, intensity I fluctuates about a different level for the subsequent combustion processes, which is markedly lower than the level prior to time t0.

If the irregular combustion is not engine knock, but rather a premature ignition or a surface ignition, the ignition angle is normally not adjusted, but rather other changes of an operating parameter are initiated, which result in avoiding the irregular combustion, i.e., the premature ignition or the surface ignition. For a surface ignition and premature ignition, changes of operating parameters of the internal combustion engine are normally introduced that result in a greater cooling of the combustion chamber or of the combustion such as for example an injection of water, a change of the fuel or air quantity or exhaust-gas recirculation.

Furthermore, FIG. 2 shows the reference level, which is used to assess whether or not intensity I indicates an irregular combustion. In this connection, two different curves are shown in FIG. 2. As may be seen in FIG. 2, reference level Ref also fluctuates with a slight fluctuation about a certain level, these fluctuations being somewhat smaller than the fluctuations of intensity I. This is due to the fact that multiple intensities I always enter into the formation of the comparison value Ref such that the value for the reference level fluctuates less than intensity I. Due to the influence of the high intensity at time t0, there is at time t0 also a strong rise of the reference level, this rise of course being less in comparison to the intensity, since the last combustion, of course, enters into the new calculation only with the factor F.

Following the time t0, the curve continues as seen in plot 21 if factor F remains the same prior to and after time t0. As may be seen from the progression of curve 21, it takes a certain time until the reference level is likewise lowered due to the lower new level of intensity I. Following the occurrence of an irregular combustion, the present invention now provides for accelerating, for a specified period of time, the averaging for forming the reference level. This acceleration is achieved in that the factor F is increased for a specified duration compared to the operation prior to time t0, i.e. prior to the irregular combustion. By this measure, i.e., by the increase of the factor F, the averaging for forming the reference level is accelerated in that the influence of the respectively most recent combustion, i.e. the weighting of the intensity of this combustion, is increased. The reference level is thus adapted markedly more quickly as is shown in curve 22. In comparison to curve 21, the reference level adapts much more quickly to the new average value of the intensity I as a result of the acceleration of the moving average calculation.

By this measure, it is thus possible to achieve a more rapid adaptation of the reference level to the changed operating parameters of the internal combustion engine following an irregular combustion. Particularly if by the adjustment of the ignition angle, which is shown here as an example, the average intensity I is reduced, without the measure of the present invention there would be a certain insensitivity with respect to slightly knocking combustions, because the reference level is still greatly influenced by the older intensities measured prior to the irregular combustion at time t0. Hence, without the measure of the present invention, one runs the risk that slightly knocking combustions in this time period, in which curves 21 and 22 differ, are markedly more difficult to detect and that there is thus the risk of damage to the internal combustion engine.

The acceleration of the averaging occurs only for a specified period following an irregular combustion or the adjustment of an operating parameter of the internal combustion engine in the direction of an avoidance of the irregular combustion. This duration may be defined in a particular simple manner as a simple time duration. Alternatively, it is also possible to evaluate the number of combustion processes and to use the increase of factor F only for a specified number of combustions. Furthermore, it may also be possible, following an irregular combustion, to use a different factor F for each combustion process, the original value prior to the irregular combustion being reached again after a specified number of steps or a time duration.

The calculation of the reference level is achieved in a particularly simple manner by a moving average calculation, which respectively begins from an old reference level. Alternatively, however, it is also possible to store only the intensities of a specified number of combustion processes and thus to provide a defined number of combustions that are taken into account for forming the reference level. It is also possible, however, to use other kinds of averaging, which may each have different advantages and disadvantages.

FIG. 2 shows an idealized representation which starts out from constant operating parameters of the internal combustion engine and in which over a longer period of time t a constant intensity I and a reference level Ref are formed. In a real operation of the internal combustion engine, however, for example in a motor vehicle, the operating parameters change regularly, which result in fluctuations of the intensity and also of the reference level. These are taken into account by controlling the operating parameters of the internal combustion engine such as for example load or speed accordingly. The present invention may also provide in particular for factor F to be a function of these additional operating parameters. For example, for a highly dynamic range of the operating parameters of the internal combustion engine, it is possible to provide that the factor F is increased in order to allow for a speedier adjustment of the reference level to the changed operating parameters of the internal combustion engine. FIG. 2 only shows an operation at constant additional operating parameters of the internal combustion engine.

What is claimed is:

1. A method for controlling a combustion of an internal combustion engine, the method comprising:
generating a signal for an intensity of the combustion in a combustion chamber of the internal combustion engine from a sensor signal of the internal combustion engine;
comparing the intensity to a reference level, the reference level being formed from intensities of preceding combustions in the combustion chamber;
forming the reference level anew following each combustion by averaging from the intensities;
detecting an irregular combustion if the intensity exceeds the reference level in a predetermined manner; and
in the event of an irregular combustion, changing at least one operating parameter of the internal combustion engine in a direction of an avoidance of the irregular combustion;
wherein, following the detecting of the irregular combustion, the averaging for forming the reference level is accelerated for a specified duration.

2. The method as recited in claim 1, wherein the sensor signal is one of a structure-borne noise signal, a cylinder pressure signal or an ionic-current signal.

3. The method as recited in claim 1, wherein the duration is defined by a number of combustions in the combustion chamber.

4. The method as recited in claim 1, wherein the duration is defined by a time duration.

5. The method as recited in claim 1, wherein the averaging occurs by a weighted sum of a preceding average value and the intensity, and the acceleration of the averaging occurs by greater weighting of the intensity following the change of the at least one operating parameter in the direction of an avoidance of the irregular combustion.

6. The method as recited in claim 5, wherein the weighting is a function of further operating parameters of the internal combustion engine.

7. The method as recited in claim 1, wherein an engine knock of the internal combustion engine is detected as an irregular combustion.

8. The method as recited in claim 1, wherein one of a premature ignition or a surface ignition of the internal combustion engine is detected as an irregular combustion.

9. A device for controlling a combustion of an internal combustion engine, comprising:
an arrangement which generates a signal for the intensity of the combustion in a combustion chamber of the internal combustion engine from a sensor signal of the internal combustion engine, which compares the intensity to a reference level, the reference level being formed from intensities of preceding combustions in the combustion chamber, which forms the reference level anew following each combustion by averaging from the intensities; which detects an irregular combustion if the intensity exceeds the reference level in a predetermined manner, and which, in the event of an irregular combustion, changes at least one operating parameter of the internal combustion engine in the direction of an avoidance of the irregular combustion, wherein the arrangement accelerates the averaging for forming the reference level for a predetermined duration following an irregular combustion.

* * * * *